United States Patent
Green

(10) Patent No.: US 9,031,763 B2
(45) Date of Patent: May 12, 2015

(54) FUEL MIXTURE SYSTEM AND ASSEMBLY

(71) Applicant: Jason Green, Davie, FL (US)

(72) Inventor: Jason Green, Davie, FL (US)

(73) Assignee: Gaseous Fuel Systems, Corp., Weston, FL (US)

( * ) Notice: Subject to any disclaimer, the term of this patent is extended or adjusted under 35 U.S.C. 154(b) by 0 days.

(21) Appl. No.: 14/175,325

(22) Filed: Feb. 7, 2014

(65) Prior Publication Data
US 2015/0025775 A1    Jan. 22, 2015

Related U.S. Application Data

(63) Continuation of application No. 14/175,231, filed on Feb. 7, 2014, which is a continuation of application No. 13/948,514, filed on Jul. 23, 2013, which is a continuation of application No. 13/947,410, filed on Jul. 22, 2013.

(51) Int. Cl.
*B60T 7/12*    (2006.01)
*F02D 41/30*   (2006.01)
*F02D 43/04*   (2006.01)

(52) U.S. Cl.
CPC ............... *F02D 41/30* (2013.01); *F02D 43/04* (2013.01)

(58) Field of Classification Search
CPC .............. F02D 41/00; F02B 1/04; F02B 1/06; F02B 43/00; F02B 2043/103
USPC .......... 701/103, 104, 105, 114, 115; 123/1 A, 123/434, 436, 679, 681, 27 GE, 525, 526, 123/527
See application file for complete search history.

(56) References Cited

U.S. PATENT DOCUMENTS 3,866,781 A    2/1975   Stedman et al.
4,006,852 A    2/1977   Pilsner et al.
(Continued)

FOREIGN PATENT DOCUMENTS

WO    WO 02/101214    12/2002
WO    WO 2008/037175   4/2008
(Continued)

OTHER PUBLICATIONS

GFS Corp., 'First LNG Mining Truck in U.S.' [online press release]. Oct. 21, 2010, Retrieved from the Internet on Oct. 25, 2012: http://www.d2ginc.com/PDF/FIrst%20LNG%20Mining%20Truck%20In%20US%20Press%20Kit%20Oct%2021.pdf.
(Continued)

*Primary Examiner* — John Kwon
(74) *Attorney, Agent, or Firm* — Malloy & Malloy, P.L.

(57) ABSTRACT

A system and attendant structural assembly operative to establish a coordinated mixture of gaseous and distillate fuels for an engine including an electronic control unit (ECU) operative to monitor predetermined engine data determinative of engine fuel requirements and structured to regulate ratios of the gaseous and distillate fuel of an operative fuel mixture for the engine. The system and assembly includes at least one mixing assembly comprising an integrated throttle body and air gas mixer directly connected to one another, wherein the throttle body is disposed in fluid communication with a pressurized gaseous fuel supply and the air gas mixer is disposed in fluid communication with a flow of intake air to a combustion section of the engine. In use, the throttle body is structured to direct a variable gaseous fuel flow directly to the air gas mixer for dispensing into the intake air flow to the combustion section.

13 Claims, 8 Drawing Sheets

(56) References Cited

U.S. PATENT DOCUMENTS

| | | | |
|---|---|---|---|
| 4,078,629 | A | 3/1978 | Kutay et al. |
| 4,288,086 | A | 9/1981 | Oban et al. |
| 4,335,697 | A | 6/1982 | McLean |
| 4,415,051 | A | 11/1983 | Taylor |
| 4,442,665 | A | 4/1984 | Fick et al. |
| 4,489,699 | A | 12/1984 | Poehlman |
| 4,522,159 | A | 6/1985 | Engel et al. |
| 4,527,516 | A | 7/1985 | Foster |
| 4,535,728 | A | 8/1985 | Batchelor |
| 4,603,674 | A | 8/1986 | Tanaka |
| 4,606,322 | A | 8/1986 | Reid et al. |
| 4,617,904 | A | 10/1986 | Pagdin |
| 4,641,625 | A | 2/1987 | Smith |
| 4,708,094 | A | 11/1987 | Helmich et al. |
| 4,770,428 | A | 9/1988 | Sugiyama |
| 4,799,565 | A | 1/1989 | Handa et al. |
| 4,817,568 | A | 4/1989 | Bedford |
| 4,861,096 | A | 8/1989 | Hastings |
| 4,955,326 | A | 9/1990 | Helmich |
| 5,033,567 | A | 7/1991 | Washburn et al. |
| 5,050,550 | A | 9/1991 | Gao |
| 5,081,969 | A * | 1/1992 | Long, III ............... 123/274 |
| 5,092,305 | A | 3/1992 | King |
| 5,156,230 | A | 10/1992 | Washburn |
| 5,215,157 | A | 6/1993 | Teich |
| 5,224,457 | A | 7/1993 | Arsenault et al. |
| 5,355,854 | A | 10/1994 | Aubee |
| 5,370,097 | A | 12/1994 | Davis |
| 5,379,740 | A | 1/1995 | Moore et al. |
| 5,518,272 | A | 5/1996 | Fukagawa et al. |
| 5,526,786 | A | 6/1996 | Beck et al. |
| 5,546,908 | A | 8/1996 | Stokes |
| 5,566,653 | A | 10/1996 | Feuling |
| 5,593,167 | A | 1/1997 | Barnhardt et al. |
| 5,701,928 | A | 12/1997 | Aoki |
| 5,735,253 | A | 4/1998 | Perotto et al. |
| 5,794,979 | A | 8/1998 | Kasuga et al. |
| 5,810,309 | A | 9/1998 | Augustine et al. |
| 5,845,940 | A | 12/1998 | Colburn |
| 5,937,800 | A | 8/1999 | Brown et al. |
| 6,003,478 | A | 12/1999 | Huber |
| 6,041,762 | A | 3/2000 | Sirosh et al. |
| 6,101,986 | A | 8/2000 | Brown |
| 6,168,229 | B1 | 1/2001 | Kooi et al. |
| 6,250,260 | B1 * | 6/2001 | Green ............... 123/27 GE |
| 6,289,881 | B1 | 9/2001 | Klopp |
| 6,513,485 | B2 * | 2/2003 | Ogawa et al. ............... 123/295 |
| 6,543,395 | B2 | 4/2003 | Green |
| 6,550,811 | B1 | 4/2003 | Bennett et al. |
| 6,676,163 | B2 | 1/2004 | Joitescu et al. |
| 6,718,952 | B2 | 4/2004 | Finch |
| 6,751,835 | B2 | 6/2004 | Fenton |
| 6,875,258 | B2 | 4/2005 | Kuperus |
| 6,938,928 | B2 | 9/2005 | Pfohl et al. |
| 7,019,626 | B1 | 3/2006 | Funk |
| 7,270,209 | B2 | 9/2007 | Suess |
| 7,299,122 | B2 * | 11/2007 | Perkins ............... 701/102 |
| 7,334,818 | B2 | 2/2008 | Mascarenhas et al. |
| 7,341,164 | B2 | 3/2008 | Barquist et al. |
| 7,607,630 | B2 | 10/2009 | Jung et al. |
| 7,775,311 | B1 | 8/2010 | Hardy et al. |
| 7,874,451 | B2 | 1/2011 | Bel |
| 7,976,067 | B2 | 7/2011 | Naganuma et al. |
| 8,005,603 | B2 | 8/2011 | Fisher et al. |
| 8,282,132 | B2 | 10/2012 | Griesbaum |
| 8,498,799 | B2 | 7/2013 | Matthews, Jr. et al. |
| 8,534,403 | B2 | 9/2013 | Pursifull |
| 8,550,274 | B2 | 10/2013 | Gerding |
| 8,556,107 | B2 | 10/2013 | Mcrobbie et al. |
| 2001/0037549 | A1 | 11/2001 | Fenton |
| 2002/0017088 | A1 | 2/2002 | Dillon |
| 2002/0029770 | A1 | 3/2002 | Heffel et al. |
| 2002/0030397 | A1 | 3/2002 | Tamura et al. |
| 2002/0078918 | A1 | 6/2002 | Ancimer et al. |
| 2003/0178422 | A1 | 9/2003 | Kosuge et al. |
| 2004/0011050 | A1 * | 1/2004 | Inoue ............... 60/773 |
| 2004/0140412 | A1 | 7/2004 | Hendzel et al. |
| 2004/0148086 | A1 | 7/2004 | Tafazoli et al. |
| 2005/0121005 | A1 | 6/2005 | Edwards |
| 2006/0033322 | A1 | 2/2006 | Suess |
| 2008/0023957 | A1 | 1/2008 | Diehl |
| 2009/0152043 | A1 | 6/2009 | Lee |
| 2009/0320786 | A1 | 12/2009 | Fisher |
| 2010/0045017 | A1 | 2/2010 | Rea |
| 2010/0078244 | A1 | 4/2010 | Pursifull |
| 2010/0127002 | A1 | 5/2010 | Bel |
| 2012/0001743 | A1 | 1/2012 | Cotten et al. |
| 2012/0060800 | A1 | 3/2012 | Green |
| 2012/0067660 | A1 | 3/2012 | Kashu et al. |
| 2012/0325355 | A1 | 12/2012 | Docheff |
| 2013/0068905 | A1 | 3/2013 | Green |
| 2013/0069357 | A1 | 3/2013 | Green |
| 2013/0074816 | A1 | 3/2013 | Green |
| 2013/0092694 | A1 | 4/2013 | Green |
| 2013/0112768 | A1 | 5/2013 | Hagenbuch |
| 2013/0245864 | A1 | 9/2013 | Frazier et al. |
| 2014/0053800 | A1 | 2/2014 | Steffen et al. |

FOREIGN PATENT DOCUMENTS

| | | |
|---|---|---|
| WO | WO 2012/036768 | 3/2012 |
| WO | WO 2013/039708 | 3/2013 |
| WO | WO 2013/048812 | 4/2013 |
| WO | WO 2013/058988 | 4/2013 |

OTHER PUBLICATIONS

Caterpillar 785C Mining Truck Spec Sheet, 2010.

* cited by examiner

FUEL MIXTURE SYSTEM AND ASSEMBLY

CLAIM OF PRIORITY

The present application is a continuation-in-part application of previously filed, now pending, application having Ser. No. 14/175,231, filed on Feb. 7, 2014, which is a continuation-in-part patent application of previously filed, now pending, patent application having U.S. Ser. No. 13/948,514, filed on Jul. 23, 2013, which is a continuation-in-part patent application of previously filed, now pending, patent application having U.S. Ser. No. 13/947,410, filed on Jul. 22, 2013.

BACKGROUND OF THE INVENTION

1. Field of the Invention

This invention is directed to a system and attendant apparatus operative to establish a variable operative fuel mixture for powering a stationary engine or generator, as well as a vehicle engine. The operative fuel mixture may comprise a varying ratio of both a gaseous fuel, such as natural gas, and a distillate fuel, such as diesel. The ratio of gaseous and distillate fuel is dependent, at least in part, on a plurality of operating characteristics of the engine, which are monitored by an electronic control unit (ECU). The system is adaptable for determining an efficient and effective operative fuel mixture due at least partially to the inclusion of one or more mixing assemblies each comprising and integrated throttle body and air-gas mixer.

2. Description of the Related Art

Typically large, stationary engines as well as mobile engines used to power heavy duty industrial vehicles are powered by either direct drive diesel or diesel electric power trains frequently including a multiple horse power turbo charged operation.

Accordingly, it is well recognized that distillate fuels, specifically diesel, are used as the primary fuel source for such engines. Attempts to maximize the operational efficiency, while maintaining reasonable safety standards, have previously involved modified throttle control facilities. These attempts serve to diminish adverse effects of control mechanisms which may be potentially harmful to the engine operation and may also be at least generally uneconomical. Typical adverse effects include increased fuel consumption and wear on operative components. Therefore, many diesel engines are expected to accommodate various types of high capacity loads and provide maximum power for relatively significant periods of operation. As a result, many diesel engines are commonly operated at maximum or near maximum capacity resulting in an attempted maximum power delivery from the engine and consequent high rates of diesel consumption. It is generally recognized that the provision of a substantially rich fuel mixture in the cylinders of a diesel engine is necessary for providing maximum power when required. Such continued high capacity operation of the engine results not only in wear on the engine components, but also in high fuel consumption rates, lower operating efficiencies, more frequent oil changes and higher costs of operation.

Accordingly, there is a long recognized need for a fuel control system specifically intended for use with high capacity, variable or constant speed compression ignition engines that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuels can comprise a natural gas or other appropriate gaseous type fuels, wherein distillate fuel would typically include, but not be limited to diesel fuel.

Such a preferred and proposed fuel control system should be capable of regulating the composition of the operative fuel mixture on which the engine operates to include 100% distillate fuel, when the operating mode(s) thereof clearly indicate that the combination of gaseous and distillate fuels is not advantageous. Further, such a proposed fuel control system could have an included secondary function to act as a general safety system serving to monitor critical engine operating parameters. As a result, control facilities associated with such a preferred fuel control system should allow for discrete, user defined control and safety set points for various engine and/or fuel system parameters.

In order to enhance efficient operation of an engine it is known to use a mass air flow sensor to determine the mass flow rate of air entering an internal combustion engine. It is known that air changes its density as it expands and contracts with temperature and pressure. As a result, it has been found that the determination of mass air flow is more appropriate than volumetric flow sensors for accurately determining the quantity of intake air delivered to the combustion section of the engine.

In the proper operation of CI engines, other factors to be considered include, but are not limited to, the occurrence of engine knocking. Knocking is a common occurrence in diesel engines where fuel is injected into highly compressed air at the end of the compression stroke. There is a short lag between the fuel being injected and combustion starting. Typically there is a quantity of fuel in the combustion chamber which will be ignited first in areas of greater oxygen density prior to the combustion of the complete fuel charge. A sudden increase in pressure and temperature may cause what has been recognized as a distinctive diesel "knock" or "clatter".

Yet another factor to be considered in the effective and efficient performance of CI engines is "flammability limits". Flammability limits refer to the fact that mixtures of gaseous fuel and air will only burn if the fuel concentration lies within well defined limits. The terms "flammability limits" and "explosive limits" are used interchangeably and recognized flammability limits are typically determined experimentally. Maintaining a preferred combination of fuel and air in an explosive mixture is important in internal combustion engines specifically including, but not limited to, CI engines or diesel engines. In addition, it is important to maintain the air fuel mixture below "lower flammability limits" prior to the delivery of the air fuel mixture into the combustion chambers in order to avoid or restrict pre-ignition and resultant damage to the engine.

Another known characteristic of CI or diesel engines is the establishment of a single safety set point occurring at maximum load conditions of the engine. However, due to the fluctuation of engine performance in the variable range of loads at which the engine operates, the proposed improvement in the functionality of CI engines would be the establishment of a system capable of dynamic set point protection. More specifically, a proposed system which may be originally included or retrofitted into a diesel engine would be the inclusion of structural and operative features which allows the CI engine to operate on a variable mixture of gaseous and distillate fuel. Moreover, under such operating conditions dynamic set point protection would comprise the ability to monitor engine performance across a variable range of engine loads and in association therewith determine a plurality of discrete safety and control set point values. As such, the determination of safety and control set point values would result in either engine shut-off or a deactivation of a gaseous/distillate operative mode and a transition to a full distillate operative mode when the responding safety and/or control set points indicate that engine shut off and/or 100% diesel mode operation is appropriate.

SUMMARY OF THE INVENTION

This invention is directed to a system and included apparatus, comprising technology that allows for the safe and efficient use of a gaseous fuel such as, but not limited to, natural gas, in combination with a predetermined quantity of conventional distillate fuel, such as diesel fuel. As a result, the composition of an "operative fuel mixture" used to power an associated engine will, dependent on the operating modes and/or operating characteristics thereof, be either a combined mixture of gaseous fuel and distillate fuel or substantially entirely distillate fuel, absent any contribution of gaseous fuel.

Moreover, the fuel control system of the present invention incorporates "real time" measurement capabilities specifically, but not exclusively, of each of the gaseous fuel and distillate fuel and the operative fuel mixture. More specifically, metering technology appropriate to each of the gaseous and distillate fuels will be used to establish the percentage of gaseous fuel and diesel fuel contained in the composition of the operative fuel mixture. Such appropriate metering will also facilitate the tracking of the overall gaseous fuel and diesel fuel consumption.

Accordingly, the system of at least one preferred embodiment of the present invention includes both controlling and safety features, specifically adaptable for use with compression ignition engines (CI), of the type more fully described herein. It is to be noted that the term "operative fuel mixture" may, as set forth above, include a composition composed of both gaseous fuel and distillate fuel present in varying ratios. However, for purposes of clarity, the term "operative fuel mixture" may also specifically refer to a composition comprised substantially entirely of the distillate fuel. Therefore, and as set forth in greater detail hereinafter, the composition of the operative fuel mixture may best comprise both gaseous fuel and distillate fuel in predetermined quantities, wherein the ratio of the gaseous and distillate fuels may vary. It is again emphasized, that the term "gaseous fuel" is meant to include natural gas or other gaseous type fuels appropriate for engine operation. Similarly, the term "distillate fuel" refers primarily, but not exclusively, to a diesel fuel.

The system and assembly of the present invention allows operators of stationary engines, including electric power generators and/or vehicle mounted engines, to substantially reduce costs, extend run time and improve sustainability by substituting natural gas or other gaseous fuel for a portion of the distillate fuel, such as diesel fuel in predetermined ratios. As a result, safe use of a natural gas and other gaseous fuel is used in place of distillate fuel with the combined ratios of an "operative gas mixture" in the range of 50% to 70% of the engines total fuel requirement. Importantly, generators or other stationary engines converted with the system and assembly of the present invention exhibit diesel like performance in such critical areas as load acceptance, power output, stability and efficiency.

Additional advantages of the system and assembly of the present invention allow for the onsite conversion of stationary or mobile engines to natural gas and/or diesel fuel operation. The installation and/or conversion process utilizes components that are installed externally of the engine/generator in a manner which does not require any changes or modifications to the combustion section thereof. As such, OEM combustion section components including cylinders, pistons, fuel injectors and/or cylinder heads remain the same. By retaining the OEM diesel or distillate fuel system in its entirety, the operative and structural features of the present invention maintains the engines capability to operate solely on diesel fuel when such is needed based on the operational modes or operating characteristics of the engine.

Moreover, the present invention utilizes "pipe-line supplied gaseous fuel" at a positive pressure, generally in the range of 3 psi to 7 psi. Accordingly, gaseous fuel is added to the intake air of the combustion section of the engine, at a positive pressure, utilizing one or more unique mixing assemblies. In more specific terms, each of the one or more mixing assemblies includes an electronically controlled throttle body integrated with a fixed geometry, low restriction air gas mixture. In terms of the integrated features of the throttle body and corresponding air gas mixer, the air gas mixer comprises a housing wherein the throttle body is fixedly mounted on or connected directly to the housing of the corresponding air gas mixer, such as on the exterior thereof. In addition, at least a portion of the housing of the air gas mixer is disposed in and thereby may at least partially define a path of travel or flow line of intake air to the combustion section of the engine. Moreover, a dispensing nozzle is disposed within the interior of the housing in direct communication and/or aligned relation within the flow path of the intake air. Further, a delivery conduit is disposed on the interior of the housing of the air gas mixer in interconnecting, gaseous fuel delivering relation between the throttle body and the dispensing nozzle.

As indicated, the supply of gaseous fuel is maintained at a positive pressure and delivered from the fuel supply to the throttle body and eventually from the throttle body to the corresponding, integrated air gas mixer at such positive pressure. Therefore, the gaseous fuel supply, throttle body and integrated air gas mixer are cooperatively structured and collectively operative to deliver gaseous fuel in appropriate, variable quantities and under a positive pressure to the intake air of the combustion section of the engine. This may differ from conventional fuel systems, wherein fuel is not maintained under a positive pressure or "pushed" from a fuel delivery assembly into the flow path of intake air. Moreover, one advantageous feature of the positive pressure delivery of the gaseous fuel of the present invention comprises the ability to "predict" and/or more precisely control the quantity of gaseous fuel being delivered to the flow of intake air and to the combustion section of the engine. As a result the maximum amount of gaseous fuel, within predetermined limits or parameters, may be added to the gaseous and distillate fuel mixture of the operative fuel composition and thereby assure efficient operation of the engine without consuming an excessive amount of distillate fuel. Factors which may limit the delivery of the maximum quantity of gaseous fuel, as set forth above may include, but are not limited to, the occurrence of "knocking" in the engine, maintaining appropriate lower flammability limits, etc.

Further direct mounting or connection of the throttle body to the integrated air gas mixer provides an additional safety feature. More specifically, due to such an integrated structure, there will not be a collection of gaseous fuel in a connecting conduit or line, between throttle body and air gas mixer and/or intake air, which may exist in conventional fuel systems. Therefore, unlike conventional fuel delivery connections, the gaseous fuel of the present invention may be "pushed" under the aforementioned positive pressure from the throttle body directly into the air gas mixer.

Dependent on the structural and operative features of the engine and/or generator with which the system and included structure is utilized, a turbo charger may be disposed within one or more intake air flow paths to the combustion chamber. When one or more turbochargers are so utilized and installed, the integrated throttle body and air gas mixer are disposed in fluid communication with the corresponding flow path upstream of the turbocharger. In yet another preferred embodiment of the system and assembly of the present invention a plurality of mixing assemblies are utilized, wherein each mixing assembly comprises an integrated throttle body and air gas mixer. As set forth above, the structural integration of each of the throttle body and corresponding air gas mixer comprises the air gas mixer including a housing disposed at least partially within and thereby at least partially defining the intake air flow path to the combustion section of the engine. Further, each throttle body will be fixedly mounted on or directly connected to the corresponding, integrated air gas mixer, such as on the housing thereof, to at least partially define the integrated structure thereof. The result of this integrated structure will be the advantages and enhanced operative features, as set forth above.

As also indicated, each of the throttle bodies are independently operable based on monitored data determined by the ECU. As a result, each of a plurality of integrated throttle bodies/air gas mixers may provide a different and variable gaseous fuel flow to a different intake air flow path and corresponding combustion cylinder of the combustion section of the engine. Therefore, each combustion cylinder associated with the engine/generator with which the system of the present invention is utilized, may receive a gaseous fuel and distillate fuel mixture which differs from one or more of the other cylinders, depending upon the operating characteristics of the engine. This allows for even greater efficiency in regulating output of the engine based on operating characteristics of the engine, as detected by the monitoring capabilities of the ECU. Such engine operating characteristics include, but are not limited to, fuel rates, exhaust gas temperatures, vibrations levels, manifold air temperatures, mass air flow, gas pressures, engine coolant temperature, engine RPM, compressor inlet pressures and/or manifold air pressures. Operational enhancement and versatility of the ECU is structured to sample each data input up to 50 times per second thereby insuring rapid detection and collection of anomalies.

Yet another preferred embodiment of the present invention is directed to a fuel control system operative to establish gaseous fuel input for a compression ignition (CI) or diesel engine which is powered by a variable mixture of gaseous and distillate fuels dependent, at least in part, on the operating characteristics or parameters of the CI engine. Moreover, this additional preferred embodiment includes an electronic control module (ECU), of the type generally described above and in greater detail herein. As such, the ECU is operative to determine and/or regulate a concentration of gaseous fuel added into the intake air which is then directed to the combustion section of the CI engine. In order to facilitate proper and more efficient operation of the CI engine, a mass air flow measuring assembly comprising at least one mass air flow (MAF) sensor. The at least one MAF sensor is disposed in monitoring relation to the flow of intake air and along the flow path thereof upstream of a throttle assembly, also to be described in greater detail herein after.

The at least one MAF sensor is operatively connected to the ECU and cooperatively structured therewith to transfer appropriate, predetermined data and/or data signals thereto. The data delivered from the MAF sensor to the ECU is indicative of mass flow rate of the intake air passing along the path of intake air flow to the combustion section of the engine. The at least one MAF sensor is preferred over other known or conventional volumetric flow sensors for determining the quantity of intake air due to its greater accuracy and/or dependency in certain applications and at least partially dependent on the use of the engine with which the one MAF sensor is combined. As will also be described in greater detail, this additional preferred embodiment defines the mass air flow measuring assembly as including the one MAF sensor comprising a "hot wire" MAF sensor. As utilized and applied, the hot-wire mass air flow sensor functions by heating a wire, which is suspended in the engines intake air, with an electric current. The wire's electrical resistance increases when the wire temperature increases. This in turn limits the electrical current flowing through the circuit. When intake air flows past the wire, the wire cools thereby decreasing its resistance, which in turn allows more current to flow through the circuit. The current flow through the circuit increases the wire's temperature until the resistance reaches equilibrium.

Accordingly, it may be determined that the operative current required to maintain the wires temperature is proportional to the "mass air flow" over the heated wire. Moreover, the integrated electronic circuit associated with the hot-wire MAF sensor converts the measurement of current to a voltage signal which is then sent to the ECU. The voltage signal or data signal, as used herein, is thereby indicative of the mass air flow rate of the intake air which in turn will be determinative, within certain operational parameters of the engine, of the amount of gaseous fuel which is added to the intake air flow directed to the combustion section of the CI engine. Further with regard to these structural and operative features of the hot-wire MAF sensor, if air density increases due to pressure increase or temperature increase or temperature drop while the air volume remains constant, the denser air will remove more heat from the heated wire indicating a higher mass air flow. Therefore, unlike other related sensors the hot-wire MAF sensor responds directly to air density. As a result, the hot-wire sensor represents a distinctive and more efficient operative component of this preferred embodiment of the fuel control system as it is better suited to support the combustion process of a CI engine which operates on a variable mixture of gaseous and distillate fuels.

Further, it is to be noted that the aforementioned predetermined operating parameters of this preferred embodiment include, but are not limited to, a maximum gaseous fuel input into the intake air flow of 4.5% by volume of the quantity of intake air based on the determination of by the mass flow rate of the intake air. Moreover, the 4.5% of gaseous fuel relative to intake air is also sufficient to maintain lower flammability limits of the air mass and gaseous fuel mixture prior to entering into the combustion chambers of the CI engine.

Additional predetermined operating parameters also include the restriction, reduction or prevention of engine knocking. More specifically, this preferred embodiment of the fuel control system of the present invention includes an engine knock sensor operatively connected to the ECU. Accordingly, when engine knocking is detected the predetermined operating parameters dictate that the input of gaseous fuel into the intake air flow is reduced to an amount which serves to eliminate or at a minimum significantly restrict the occurrence of engine knocking so as to prevent damage to the engine.

As also explained in greater detail, the "throttle assembly" used in the structure and operation of this embodiment of the fuel control system preferably comprises the "throttle body" associated with the aforementioned mixing assembly. Accordingly, the throttle assembly comprises and/or is at least partially defined by the structurally integrated throttle body and air gas mixer. Moreover, the integrated throttle body and air gas mixer is disposed and structured to dispose the throttle body in fluid communication with a positively pressured gaseous fuel supply. As a result, gaseous fuel is "pushed" under a positive pressure, to the integrated throttle body and air gas mixer and there through to the intake air flow, being directed to the combustion section of the CI engine.

Due to the fact that the gaseous fuel is delivered under a positive pressure from the gaseous fuel supply it can be more efficiently regulated by effectively "pushing" the gaseous fuel through the throttle body into the air gas mixer and therefrom directly into the intake air flow in specified quantities and/or volumes to accommodate delivery of gaseous fuel in the amounts no greater than the 4.5% by volume of intake air and/or controlled, lesser amounts to restrict engine knocking and other unwanted operating features associated with the CI engine.

Yet another preferred embodiment of the present invention is directed to a control system which includes and electronic control unit (ECU) programmed to define a plurality dynamic set points or set point values directly associated with a plurality of pre-determined operating parameters. Moreover, the plurality of dynamic set points overcome recognized disadvantages associated with the operation and control of CI engines which typically utilize a single safety set point, when the engine is operating at maximum load conditions. Accordingly, the plurality of dynamic set points are operative to determine engine shut off when necessary. In the alternative at least some of the plurality of dynamic set points are associated with corresponding ones of the plurality of predetermined operating parameters of the engine such that there is a deactivation of a gaseous-distillate operative mode of the engine and a concurrent or immediately subsequent transition to a full-distillate operative mode. Also, it is emphasized herein that the plurality of dynamic set points are determined over a variable range of engine loads and are not limited to a single established set point or value occurring when the engine is operating under maximum load conditions.

Moreover, the plurality of dynamic set points may comprise a plurality of "safety" set points as well as a plurality of "control" set points. As indicated above, the establishment or recognition of one of a possible plurality of "safety" set points would result in an engine shut-off. In contrast, the recognition or establishment of one or more "control" set point value would result in a deactivation of operational mode of the engine which fueled by a combined mixture of gaseous fuel. In contrast, the recognition or establishment of a control set point would immediately or subsequently result in the transition to a full operational mode of the engine, wherein it operates on 100% distillate fuel.

Other features of this additional preferred embodiment of the present invention include the plurality of dynamic set points or set point value for the pre-determined operating parameters of the engine being referenced to a base line performance of the engine during a 100% distillate fuel operation mode. As such, predetermined operating parameters of the engine specifically include, but are not necessarily limited to, fuel rates, exhaust gas temperatures, vibration levels of the engine, manifold air temperatures, manifold air flow (MAF), gas pressure, engine coolant temperatures, engine RPM, compressor inlet pressures, and/or manifold air pressures (MAP).

Accordingly, this additional preferred embodiment of the present invention provides for a monitoring assembly structured to determine the aforementioned pre-determined operating parameters associated with the engine performance. In operation, a plurality of data channels direct corresponding data, relating to the pre-determined operating parameters of the engine, to the ECU for programming, processing and determinative action in terms of transition of the engine to a 100% distillate fuel operation or an engine shut-off. It is further noted that in the programming operation associated with the ECU, each of a plurality of data channels is sampled up to 50 times per second ensuring rapid detection and correction of anomalies associated with each of the aforementioned determine operating parameters of the engine.

Other features associated with the present invention including the subject additional preferred embodiment as well as the remaining embodiments set forth in detail herein is the ECU being compatible with J-1939. Moreover, as also set forth herein, the monitoring assembly is also capable of monitoring a number of engine parameters including mass air flow, engine power output, diesel fuel flow etc. to accomplish the preferred and efficient operational standard whether operating on a gaseous-distillate fuel combination or a 100% distillate fuel operative mode.

Yet another preferred embodiment of the control system of the present invention comprises a monitoring assembly operatively disposed and structured to determine a predetermined plurality of operating parameters of the engine. In particular, the monitoring assembly includes a plurality of sensors, to be described in greater detail hereinafter, disposed and structured to monitor and determine a plurality of a preferred 3 predetermined operating parameters of the engine, independent of load conditions of the engine. As with the additional embodiments described herein, the control system comprises an electronic control unit (ECU) connected to the monitoring assembly and configured to interpretively process data from the monitoring assembly, wherein such data is associated with the plurality of three operating parameters being monitored. As such, the ECU is operative to establish an increased or maximum concentration of gaseous fuel in the variable fuel mixture serving to power the engine. Moreover, the concentration of gaseous fuel supplied to and comprising a portion of the variable fuel mixture will be in direct compliance with at least the monitored ones of the three predetermined operating parameters which the plurality of sensors associated with the monitoring assembly are associated.

Accordingly, the control system of this preferred embodiment of the present invention further comprises the monitoring assembly including at least one mass airflow (MAF) sensor disposed in monitoring relation to the intake air flow to a combustion section of the engine. In addition the monitoring assembly includes at least one temperature sensor disposed and structured to determine temperature of exhaust gases from the combustion section of the engine. Further, the monitoring assembly may include at least one knock sensor operatively disposed relative to the combustion section of the engine. As indicated, while the monitoring assembly of this embodiment of the present invention may include at least one of the aforementioned mass air flow sensors, exhaust gas temperature sensors and knock sensors, a preferred application of the control system, when in use, may include the monitoring assembly including a plurality of each of the (MAF) sensors, exhaust gas temperature sensors and knock sensors.

Therefore, in more specific terms the predetermined plurality of the preferred three operating parameters being monitored and determinative of the concentration of gaseous fuel in the variable fuel mixture comprise mass flow rate of intake air to the combustion section of the engine; temperature of exhaust gases from the combustion section and an occurrence of engine knock in the combustion section. Moreover, there are situations depending upon the specific application and/or engine characteristics where the ECU is operative to establish a preferred, increased and or maximum concentration of gaseous fuel in the variable fuel mixture when interpreting and processing two of the predetermined plurality of three operating parameters. Further, an additional factor to be considered is the avoidance of "lower flammable limits" (LFL) also commonly referred to as lower explosive limits. As a result, a throttle assembly of the present invention, as set forth above, may be operative in conjunction with the ECU to establish a "maximum" concentration of gaseous fuel input into the variable mixture of generally about 4.5% by volume of the mass flow rate of intake air to the combustion section. The possibility of pre-ignition and/or engine knock is reduced.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As schematically represented in the accompanying Figures, the present invention is directed to a control system and included structure operative to establish a coordinated operative fuel mixture of combined gaseous fuel and distillate fuel. The ratio of gaseous fuel to distillate fuel will vary dependent on the operating characteristics of an engine which incorporates the structural and operative features of the system of the e present invention. In particular, the control system of the present invention is specifically, but not exclusively, adaptable for use with stationary compression ignition (CI) engines or generators, which may or may not include turbo-charging capabilities.

Figure 1:
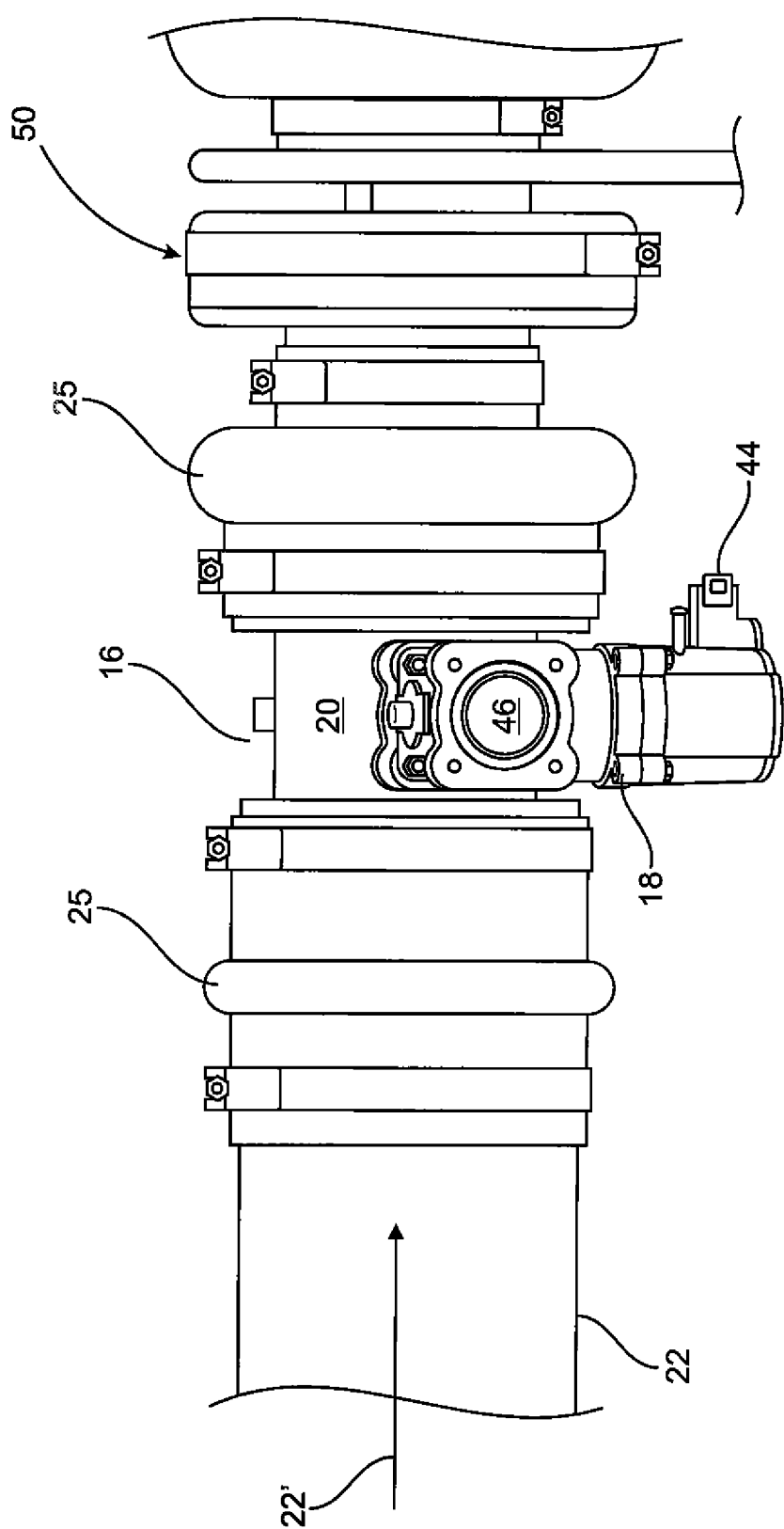
FIG. 1 is a perspective view of one preferred embodiment of the system and assembly of the present invention wherein a mixing assembly comprising an integrated throttle body and air gas mixer are connected to an intake air flow path being delivered to a combustion section of an engine/generator with which the mixing assembly is utilized.
Figure 2:
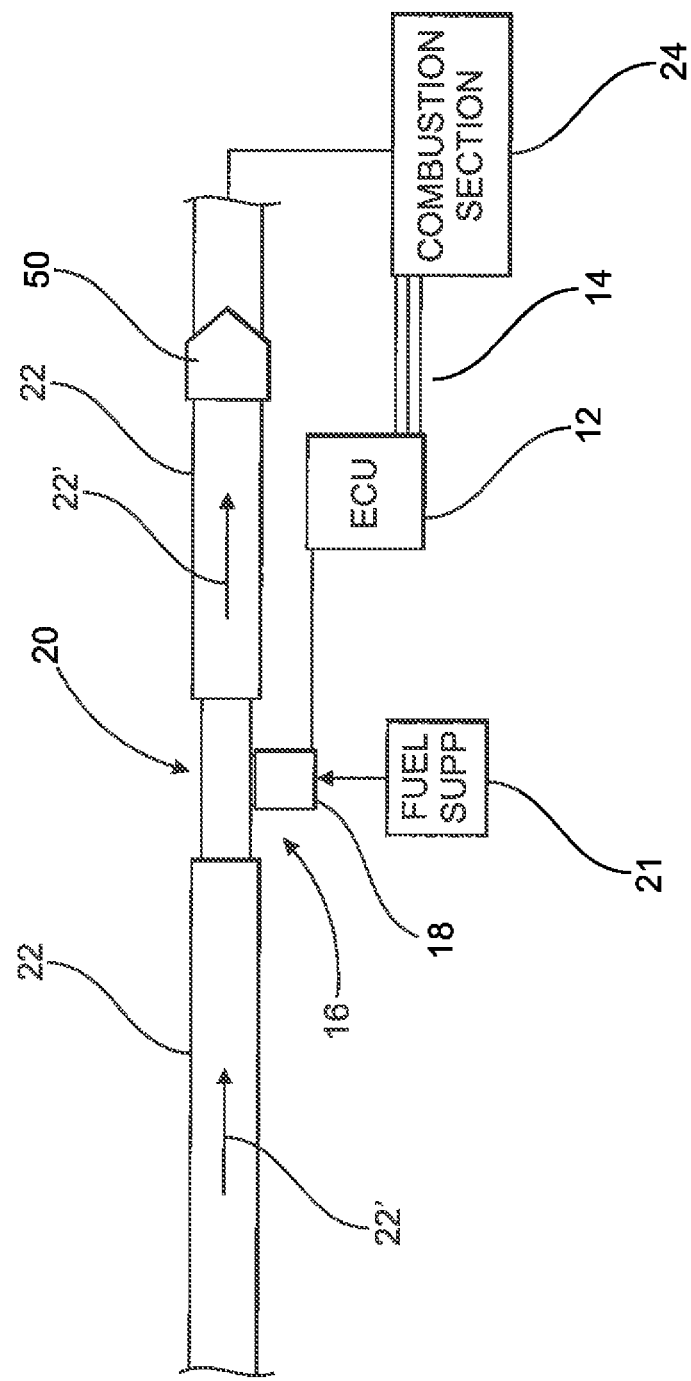
FIG. 2 is a schematic representation of the embodiment of FIG. 1.
Figure 3:
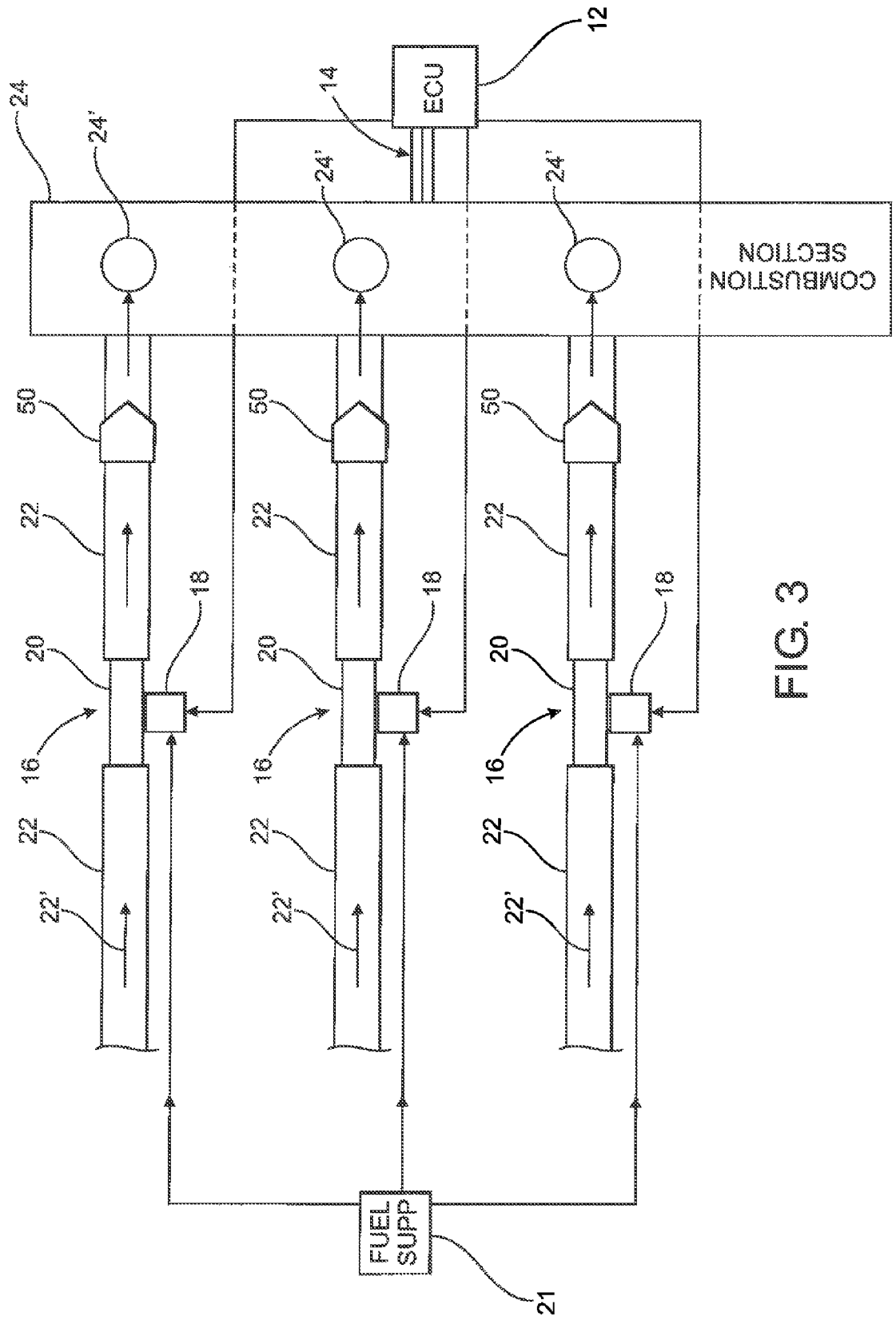
FIG. 3 is a schematic representation of yet another preferred embodiment of the system of the present invention comprising a plurality of mixing assemblies of the type represented in FIGS. 1, 4 and 5.

With primary references to FIGS. 1-3, the system of the present invention comprises an electronic control unit 12 operative to monitor at least predetermined engine data associated with and indicative of the operating characteristics of the engine with which the system is utilized. It is emphasized that FIGS. 2 and 3 are schematic representations intended to provide a detailed description of the structural and operative characteristics of the system of the present invention. As such, the electronic control unit (ECU) 12 includes a plurality of data channels 14 for the monitoring of intended, predetermined or critical parameters such as, but not necessarily limited to fuel rates, exhaust gas temperatures, operation levels, manifold air temperatures, mass air flow, gas pressure, engine coolant, engine RPM, compressor inlet pressures and manifold air pressures, etc.

In addition, one feature of the system of the present invention is the incorporation of at least one mixing assembly generally indicated as 16. As also schematically represented in FIG. 3, yet another preferred embodiment of the system of the present invention incorporates the use of a plurality of such mixing assemblies 16 as will be described in greater detail hereinafter. Accordingly, each mixing assembly 16 comprises an integrated throttle body 18 and air gas mixer 20. Each of the one or more throttle bodies 18 is connected in fluid communication with a gaseous fuel supply 22. Moreover, each of the air gas mixers 20, being structurally integrated with a corresponding one of throttle bodies 18, is disposed in direct fluid communication with a flow path 22 of intake air 22', wherein the flow path or flow line 22 may be an OEM portion of the engine, as represented in FIG. 1, so as to deliver intake air 22' to a combustion section 24 of the engine.

Figure 4:
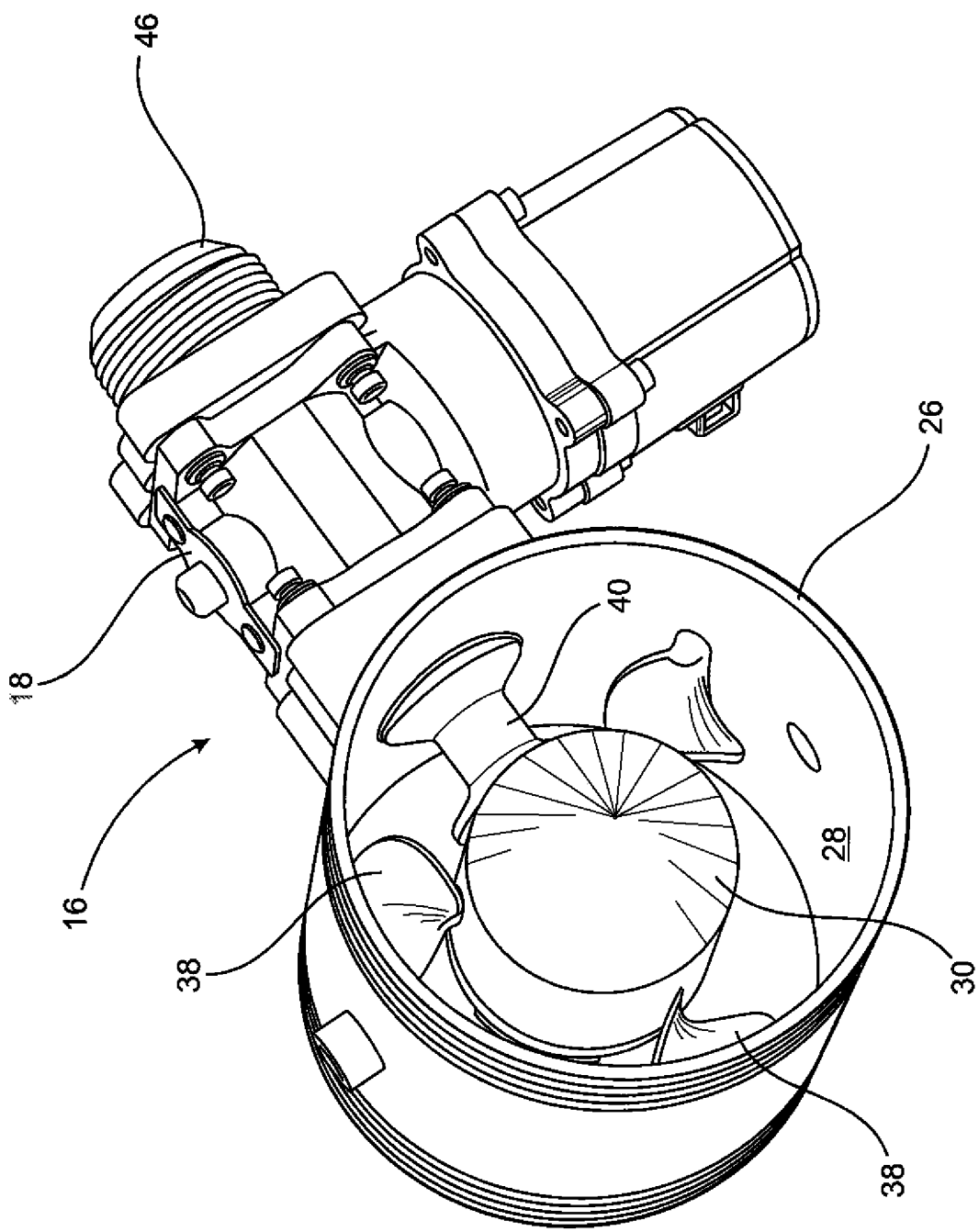
FIG. 4 is a perspective detailed view of an integrated throttle body and air gas mixer defining one of a possible plurality of mixing assemblies of the type represented in FIG. 1.
Figure 5:
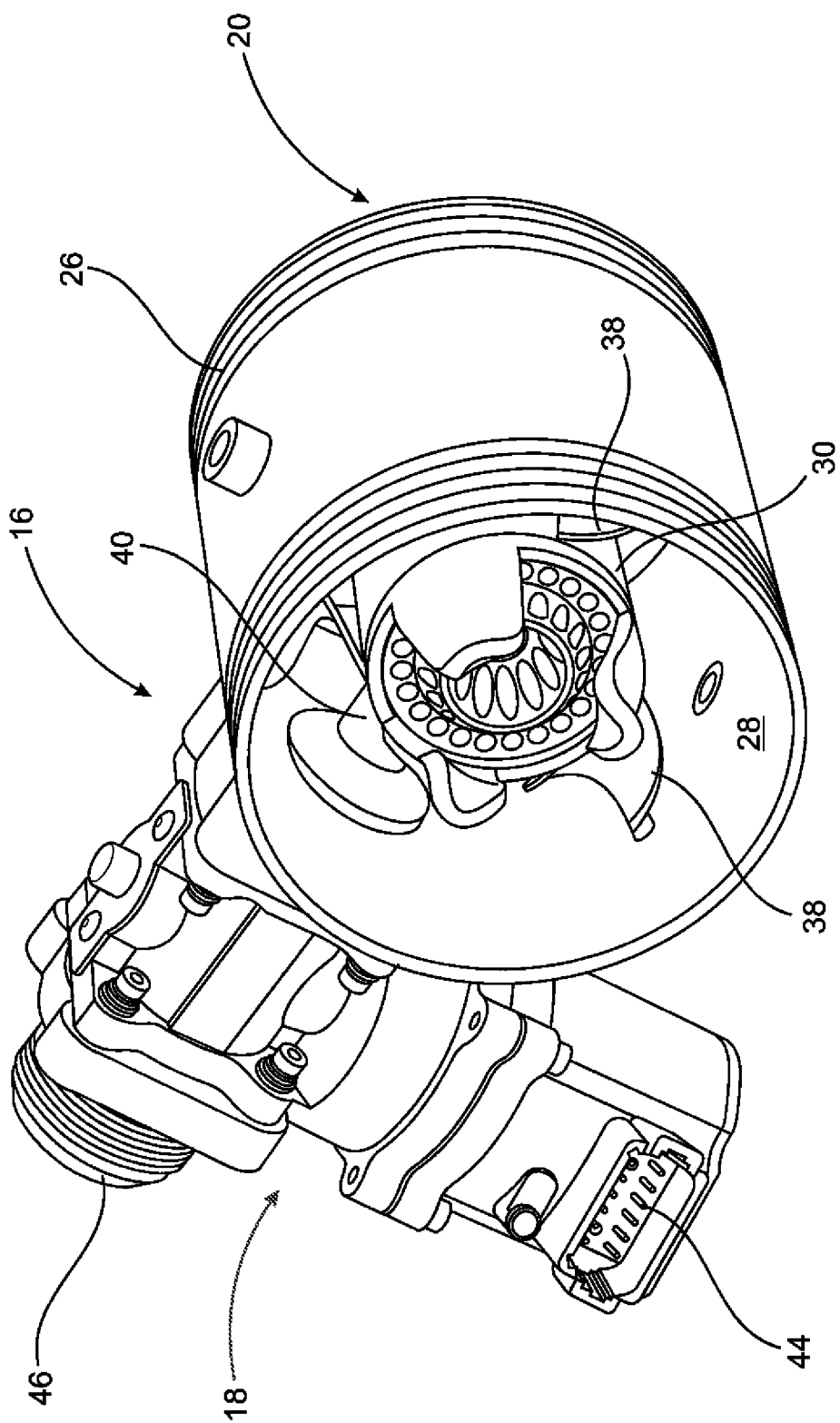
FIG. 5 is a rear perspective detailed view of the embodiment of FIG. 4.

With primary reference to FIGS. 1, 4 and 5 each of the one or more mixing assemblies 16 is defined by the structurally integrated throttle body 18 and air gas mixer 20. As such, the air gas mixer 20 includes a housing 26 having an interior 28 which at least partially defines a corresponding one of the flow paths 22 of the inlet air 22' being delivered to the combustion section 24. As clearly represented in FIG. 1, the housing 26 of the air gas mixer 20 may be installed directly in-line with the corresponding OEM air intake flow path 22, by any appropriate fluid seal connectors, as at 25, Such installation thereby facilitates the interior 28 of the housing 26 defining at least a portion of the flow path 22 of the intake air 22'.

Additional structural features of the air mixer 20 include a dispensing nozzle 30 represented in FIGS. 3 and 4. The dispensing nozzle 30 includes an aerodynamically shaped head 31 formed on one end of the nozzle 30. A plurality of dispensing nozzle ports 32, represented in FIG. 4, are disposed downstream of the head 31 and are structured to deliver or dispense the gaseous fuel, received from the corresponding, integrated air mixer 20, directly into the intake air 22' travelling along the intake air flow path 22 as set forth above. At least one, but preferably a plurality of interconnecting segments or vanes 34, are disposed and structured to facilitate the substantially aligned, supported disposition of the dispensing nozzles 30 into the flow path 22 of intake air 22'. Further, each of the connecting vanes 38 may be configured and dimensioned to not adversely disrupt air flow 22' and further facilitate proper mixing of the gaseous fuel into the flow of intake air 22'. A delivery conduit 40 is also disposed on the interior of the housing 26 and serves to provide a direct fluid flow connection of gaseous fuel from the throttle housing 18 into the delivery nozzle 30 of the corresponding, integrated air gas mixer 20.

In at least one preferred embodiment, the structural integration of the throttle body 18 and air gas mixer 20 comprises the mounting and/or direct fixed connection of the throttle body 18 on the exterior of the housing 26. Therefore, the delivery conduit 40 is in direct fluid communication between the nozzle 30 and the outlet fuel outlet (not shown) from the throttle body 18. Due to such an integrated structure, there will not be a collection of gaseous fuel in a connecting conduit or line, between throttle body and air gas mixer and/or intake air, which may exist in conventional fuel systems. Therefore, unlike conventional fuel delivery connections, the gaseous fuel of the present invention may be "pushed" under positive pressure from the throttle body 18 directly into the air gas mixer 20.

More specifically, and as indicated herein, the gaseous fuel supply 21 stores, maintains and dispenses the gaseous fuel under a positive pressure to the throttle body 18. As a result, there will be a positive pressure flow of gaseous fuel, through the delivery conduit 40, into the dispensing nozzle 30. Due to this positively pressurized fuel delivery, there will be no collection of gaseous fuel between the throttle body 18 and the dispensing nozzle 30 of the air gas mixer 20 as may be known in conventional fuel systems as at least generally set forth above. Therefore, the supply of gaseous fuel is maintained at a positive pressure and delivered from the fuel supply 21 to the throttle body 18 and eventually from the throttle body 18 to the corresponding, integrated air gas mixer 20 at such positive pressure. Accordingly, the gaseous fuel supply 21, throttle body 18 and integrated air gas mixer 20 are cooperatively structured and collectively operative to deliver gaseous fuel in appropriate, variable quantities and under a positive pressure to the intake air 22' of the combustion section 24 of the engine.

In the embodiments of FIGS. 1, 4 and 5, the throttle body 18 is electrically powered and as such includes an electrical socket or other appropriate connection 44. Further, the delivery of gaseous fuel from the fuel supply 21, under pressure, to the throttle body 18 is accomplished by interconnection of an appropriate conduit or line to a throttle body inlet 46.

With primary reference to FIG. 3 in combination with the structural details represented in FIGS. 1, 4 and 5, an additional preferred embodiment of the system comprises the electronic control unit 12 structured to monitor predetermined engine data by virtue of at least one but more practically a plurality of data input and input channels 14. As indicated, the monitored engine data is determinative of engine fuel requirements and will ultimately determine the appropriate and/or most efficient ratio between the distillate fuel and gaseous fuel defining the aforementioned operative fuel mixture being delivered to the combustion section 24 and/or the individual combustion cylinders 24' defining the combustion section 24. As with the embodiment of FIG. 2, additional preferred embodiment includes a pressurized gaseous fuel supply 21 structured to retain and dispense the gaseous fuel under a positive pressure preferably, but not necessarily, of generally about 3 psi to 7 psi. As also emphasized above, each of the one or more mixing assemblies 16 are structured to independently establish a predetermined coordinated mixture and/or ratio of gaseous and distillate fuels, which in turn define the operative fuel mixture for each combustion section 24 and more specifically for each of the combustion chambers 24'. As indicated, the supply of gaseous fuel is maintained at a positive pressure and delivered from the fuel supply 21 to the throttle body 18 and eventually from the throttle body 18 to the corresponding, integrated air gas mixer 20 at such positive pressure. Therefore, the gaseous fuel supply, throttle body 18 and integrated air gas mixer 20 are cooperatively structured and collectively operative to deliver gaseous fuel in appropriate, variable quantities and under a positive pressure to the intake air of the combustion section 24 of the engine.

Therefore, in the additional preferred embodiment of FIG. 3, a plurality of mixing assemblies 16 each include an integrated throttle body 18 and air gas mixer 20. As a result, each of the various cylinders 24' of the combustion section 24 may have a different, variable ratio of gaseous and distillate fuels delivered thereto. Accordingly, an effectively different operative fuel mixture may be consumed in the different combustion chambers 24'. It is also emphasized that the ECU 12 and the one or more input data channels 14 are structured to continuously and repetitively monitor the predetermined engine data which in turn is determinative of the specific and/or range or ratios of distillate and gaseous fuels present in the mixture of the operative fuel mixture being delivered to each of the chambers 24'.

Accordingly, each of the plurality of mixing assemblies 16 comprises the integrated throttle body and air gas mixer 18 and 20 respectively. Further, each of the throttle bodies 18 is independently connected in gaseous fuel receiving relation to a common and/or separate fuel supply 21. As also represented, each of the air gas mixers 20 is disposed in fluid communication with a different flow path 22 and the intake air 22' associated therewith. Further, the integrated structure of each of the mixing assemblies 16 include a throttle body 18 fixedly mounted on and/or connected to an exterior of a corresponding housing 26 of the associated, integrated air gas mixer 20. Similarly, each of the air gas mixers 20 includes a delivery nozzle 30 receiving gaseous fuel from a corresponding, integrated throttle body 18 through a delivery conduit 40. As such, each of the delivery conduits 40 are disposed within the interior 28 the housing 26 of corresponding ones of the air gas mixers 20.

With further regard to both FIGS. 2 and 3, dependent on the intended operation and structure of the engine with which the system of the present invention is utilized, a turbocharger 50 may be disposed within or along the flow path 22 of intake air 22' so as to further process the intake air 22' prior to being delivered to the combustion section 24 and/or individual cylinders 24'. In the embodiment of FIG. 2, a single turbocharger 50 is located between the mixing assembly 16 and the combustion section 24, such that the mixing assembly 16, including the integrated throttle body 18 and air gas mixer 20 is upstream along the flow path 22 of intake air 22' being delivered to the combustion section 24.

Figure 6:
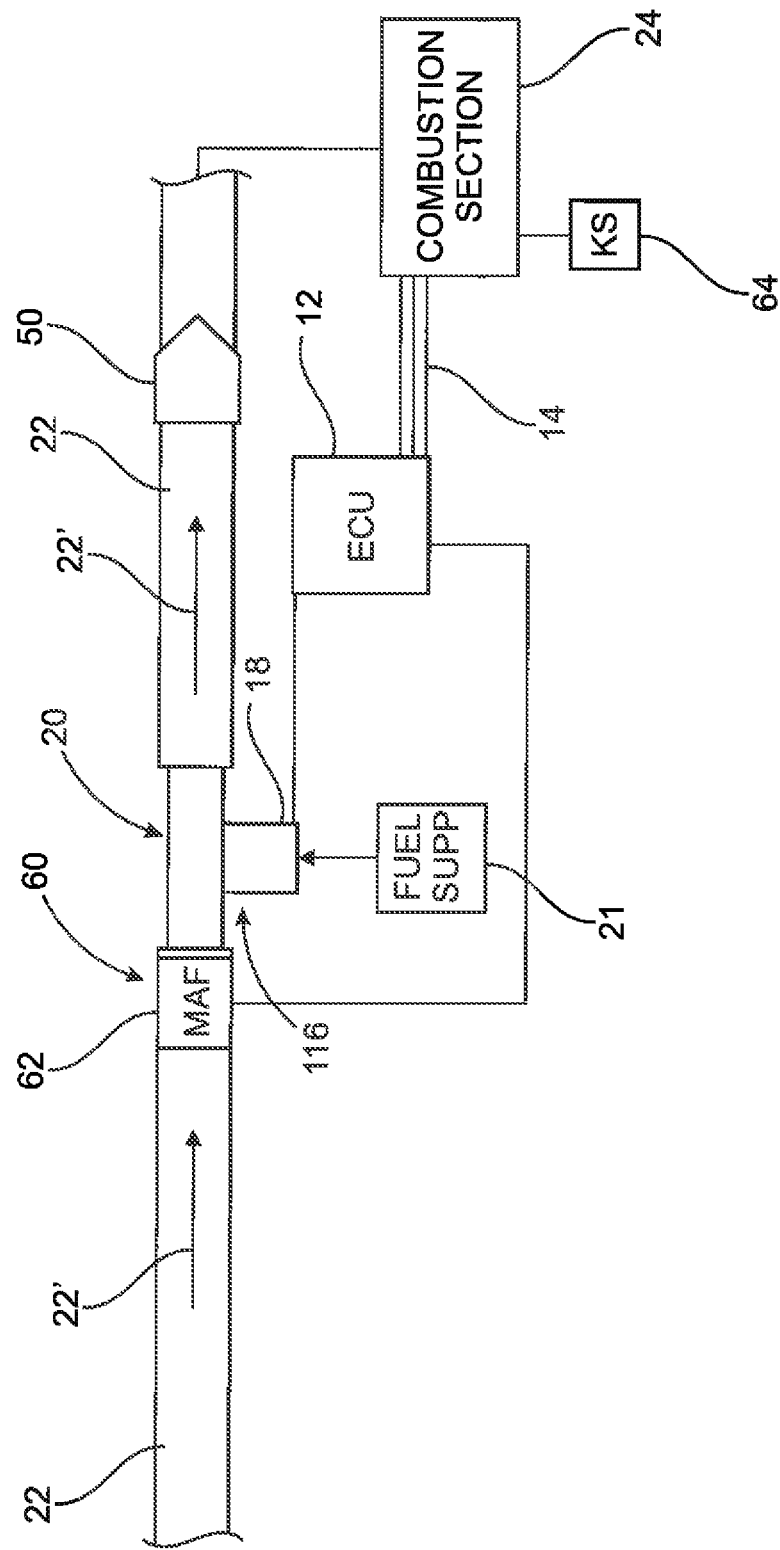
FIG. 6 is a schematic representation of yet another preferred embodiment of the fuel control system of the present invention.

Yet another preferred embodiment of the fuel control system of the present invention is schematically represented in FIG. 6. Many of the structural and operative features of the embodiment of FIG. 6 are substantially equivalent to the embodiments of FIGS. 1 through 5. Accordingly the additional preferred embodiment, as represented in FIG. 6 comprises the ECU 12 operative to monitor at least predetermined engine data associated with and indicative of the operating characteristics of the IC engine. The ECU comprises a plurality of data channels 14 for the monitoring of intended, predetermined operating parameters of the engine, which may be critical to the safety and/or appropriate fuel mixture. Such predetermined operating parameters include, but are not necessarily limited to, fuel rates, exhaust gas temperatures, operation levels, manifold air temperature, mass air flow, gas pressure, engine coolant, engine RPM, compressor inlet pressures and manifold air pressures, etc.

Further, the preferred embodiment of FIG. 6 also includes a throttle assembly which is embodied in the aforementioned and described mixing assembly, which is generally represented in FIG. 6, as 116. As such, the mixing assembly 116 comprises a structurally integrated throttle body 18 and an air gas mixer 20 connected in fluid communication with a gaseous fuel supply 21 maintained under a positive pressure. Therefore, gaseous fuel delivered from the fuel supply 21 is effectively "pushed" under the aforementioned positive pressure to the throttle body 18. The positive delivery of the gaseous fuel to the throttle body 18 and there from to the air gas mixer 20 thereby allows a "predictive" amount of gaseous fuel being delivered to the intake air 22'.

In more specific terms and again with primary referenced to FIG. 6, the ECU 12 is operative to determine and/or regulate the concentration of gaseous fuel within the intake air flow 22, 22' being delivered to a combustion section 24 of the CI engine. In order to affect a more precise quantity of gaseous fuel utilized to power the combustion section 24, a mass air flow measuring assembly 60 is inserted in fluid communication with the path of inlet air flow 22 and in direct fluid communication with the intake air 22'. Moreover, the mass air flow measuring assembly 60 preferably includes at least one mass air flow sensor 62 operatively connected to the ECU 12 so as to provide signals determination of the mass air flow rate of the intake air 22' passing along the intake flow path 22. In turn the ECU 12 is operatively connected to the mixing assembly 116 including throttle assembly including the integrated throttle body and the air gas mixer 18 and 20 respectively. As a result, gaseous fuel delivered under pressure from the fuel supply 21, will be effectively "pushed" in adequate quantities to sufficiently and safely power the combustion section 24. In addition, the throttle body 18 is cooperatively structured with the ECU 12 and operative therewith to establish a sufficient concentration and/or quantity of gaseous fuel being delivered to the intake air 22' to comply with proper operation of the CI engine in accord with predetermined operating parameters of the CI engine. As also indicated the condition or state of the predetermined operating parameters are determined by the ECU 12 over data channels 14.

Accordingly, in this preferred embodiment of the present invention, the aforementioned operating parameters specifically include, but are not limited to, a maximum gaseous fuel input into the intake air of 4.5% by volume of the quantity of intake air and/or mass flow rate thereof. Moreover, the operating parameters can also be at least partially defined by a control of the quantity of gaseous fuel into the intake air 22' which is sufficiently less to eliminate or restrict the occurrence of engine knocking. Therefore, the additional preferred embodiment of FIG. 6 may also include an engine knocking sensor 64 disposed and structured to facilitate the detection of engine knocking. Further the engine knocking sensor 64 is connected and/or operatively structured with the ECU 12 to facilitate the determination by the ECU 12 that engine knocking is or has occurred. In turn the ECU 12 is operatively connected to the throttle assembly or throttle body 18 so as to regulate and more specifically diminish the quantity of gaseous fuel being delivered into the intake air 22' through the aforementioned integrated gas mixer 20. As such, the lesser quantity of gaseous fuel, below the maximum of 4.5% by volume of intake air is sufficiently reduced to restrict the engine knocking.

Figure 7:
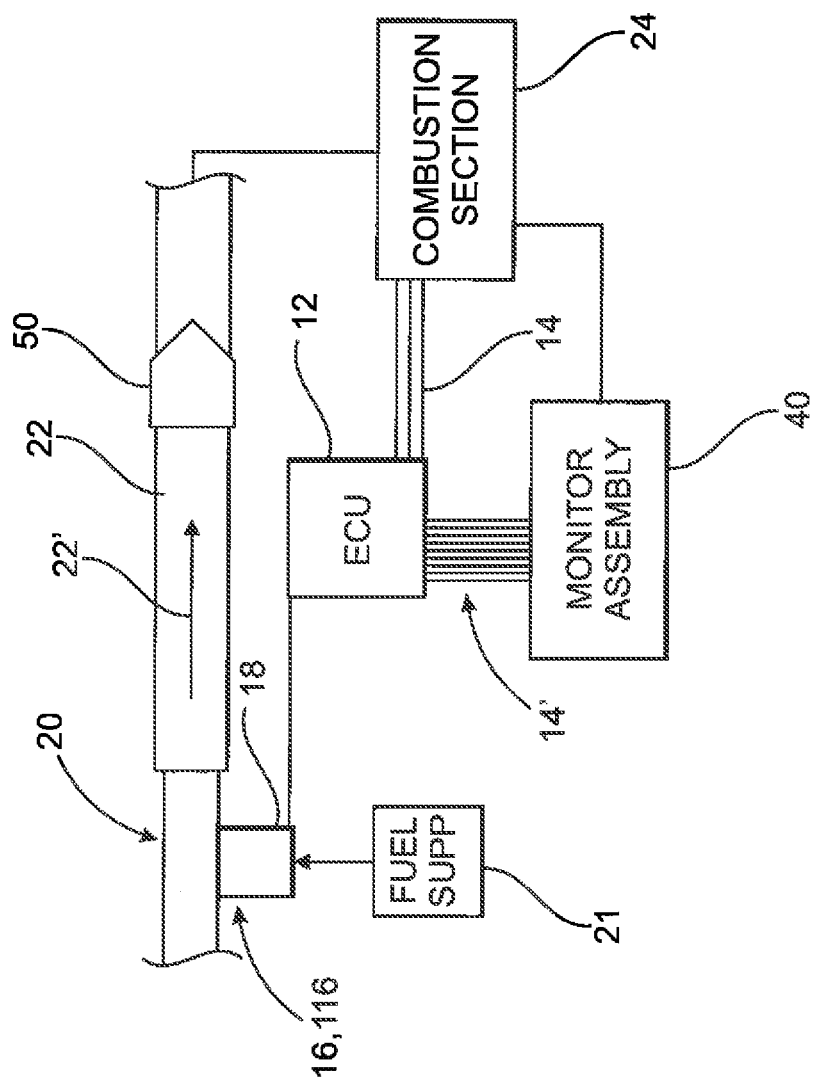
FIG. 7 is a schematic representation of yet another preferred embodiment of the fuel control system of the present invention.

Yet another preferred embodiment of the control system of the present invention is schematically represented in FIG. 7. As should be apparent from a detailed description hereinafter provided, the control system of the embodiment of FIG. 7 can be used in combination with either/or both of the embodiments as represented in the above noted FIGS. 2, 3 and 6. More specifically, the control system of the additional embodiment of FIG. 7 includes an electronically control unit (ECU) designated as 12 throughout the Figures. In addition, the ECU 12 is operatively connected to the mixing assembly 16 or 116 and is structured and programmed to operatively control or regulate the variable mixture of gaseous and/or distillate fuel being supplied to the combustion section 24 of the engine in the manner described above.

In addition, the control system in FIG. 7 includes a monitoring assembly generally indicated as 40 which is connected to the engine such as, but not limited to, the combustion section 24 and is structured to determine the condition and/or operating standards of pre-determined operating parameters associated with the engine performance. As such, the operating condition or mode of the aforementioned pre-determined parameters is delivered to the ECU for processing in a manner described hereinafter. Therefore, a plurality of data channels 14' serve to deliver corresponding data representative of the predetermined engine operating parameters over different load conditions under which the engine is operating.

For purposes of clarity, the plurality of data channels 14' are represented but at least partially distinguishable from the previously noted data channels 14. However, in actual use and as a practical application the data channels 14 and 14' may in fact be the same in that data channels 14 may very well be monitoring the same predetermined operating parameters of the engine as that detected by the monitoring assembly 40 and wherein the condition thereof are delivered to the ECU 12 over the data channels 14'.

Further, the ECU in this preferred embodiment is programmed to define a plurality of dynamic set points or set point values for the plurality of pre-determined operating parameters. It is further emphasized that the plurality of dynamic set points and the values associated with the predetermined operative parameters are monitored and/or detected over an entire range of engine loads. This is distinguishable from the prior art technologies that determine a single safety and/or control set point when the engine is operating at maximum load conditions. Accordingly, the ECU 12 is programmed and structured to define the plurality of different dynamic set points over a variable range of engine loads for each of the pre-determined operating parameters of the engine.

The monitoring assembly 40 comprises a sensor network including a plurality of sensors, monitors etc. disposed and structured to determine the "operating condition" of each of the plurality of operating parameters of the engine over any of a plurality of variable load conditions. However, the variable load conditions during the monitoring of the predetermined operating parameters may include a maximum load condition of the engine but also is specifically intended to include load conditions of the engine less that maximum load conditions. In addition, in order to monitor operation of the engine under the most efficient conditions, each of the data channels 14' may be sampled up to 50 times per second. This assures rapid detection and correction of anomalies associated with the monitored operating parameters of the engine, as well as the overall performance and operating characteristics of the engine. In addition, the plurality of dynamic set points for the operating parameters are referenced at a baseline performance of the engine during a 100% distillate fuel operative mode.

Another feature of the ECU 12, include programming capabilities capable of establishing and distinguishing both a plurality of dynamic "safety" set points or values as well as a plurality of dynamic "control" set points or values. As a result, depending upon the operating condition of the engine determined by the monitoring of the aforementioned predetermined parameters, the safety control set points and values may result in an engine shut-off when excessive or emergency set points or values have been reached. The aforementioned control set points may result in a deactivation of the gaseous-distillate operative mode of the engine and a concurrent or immediately subsequent transition of the engine to a full distillate operative mode while maintaining stability with consistent operative performance of the engine. Accordingly, the monitoring assembly 40 the data channels 14, 14' will deliver conditions of a plurality of the monitored parameters which will serve to facilitate both the safety and control of the fuel mixture on which the engine operates.

Accordingly, the ECU is structured and/or programmed to process data associated with the monitored, critical operating parameters in order to establish the plurality of safety and/or control set points and corresponding values. As such, the pre-determined critical operating parameters include fuel rates; exhaust gas temperatures, vibration levels, manifold air temperatures (MAT), mass air flow (MAF), gas pressures, engine coolant temperatures, engine rpm, compressor inlet pressure, and manifold air pressures (MAP). Additional features of the embodiment of FIG. 7 include the ECU 12 being J-1939 compatible and thereby serving to monitor the aforementioned predetermined operating parameters of the engine further including engine power output, diesel or distillate fuel flow as well as other engine parameters as set forth therein. This will serve to continually optimize the substitution and/or mixture of gaseous fuel based on the aforementioned operating conditions.

As further emphasized, the embodiment in FIG. 7 may be a part of the original equipment manufacturer of the engine or alternatively adapted for retrofit application to existing compression ignition engines. As a result, the monitoring assembly including the sensor network associated therewith may include a plurality of sensors which themselves may be OEM or maybe customized in association with the adaptive retrofit of the remaining operative and structural component of the embodiment of FIG. 7 to an existing distillate fuel operative engine.

Figure 8:
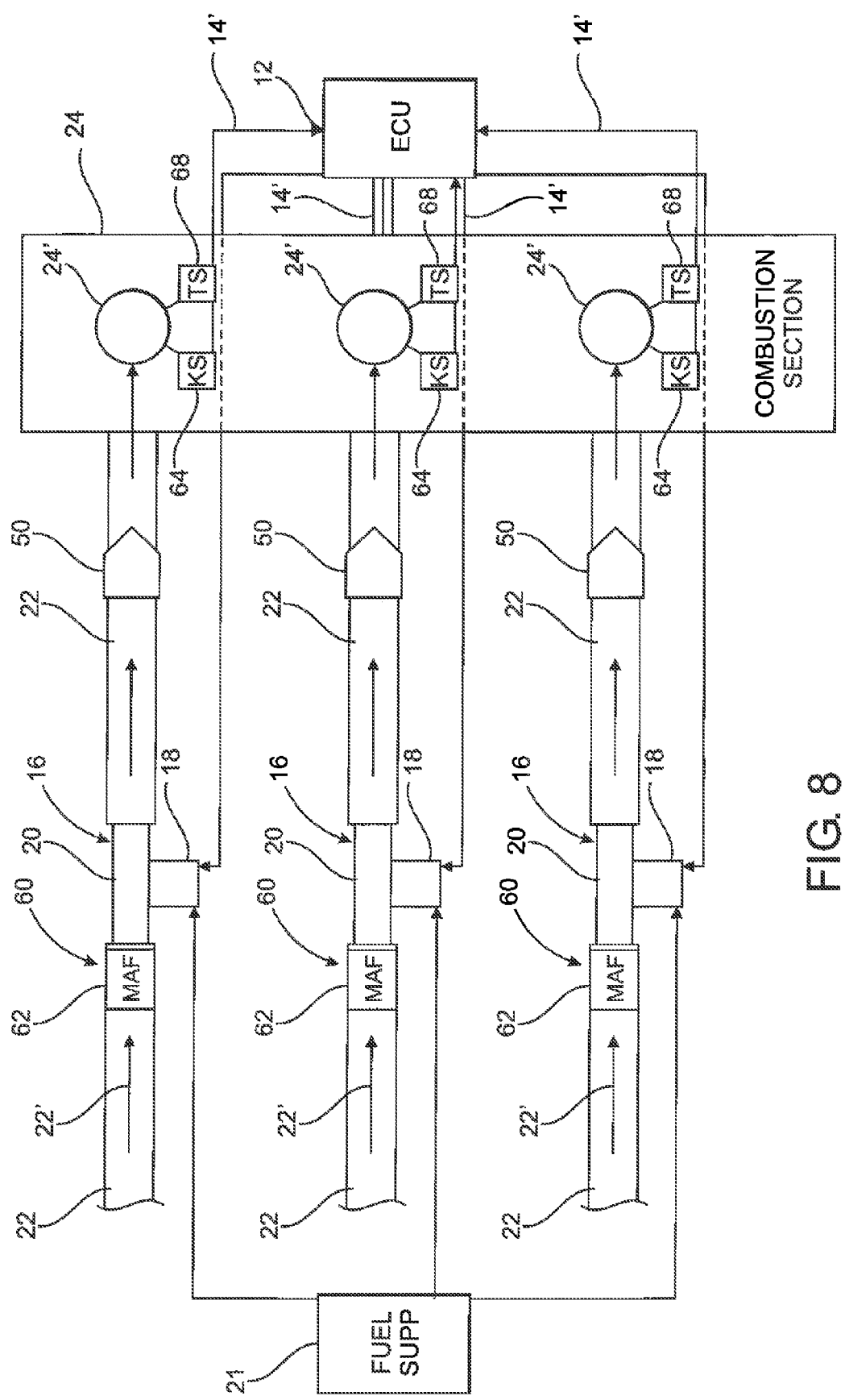
FIG. 8 is a schematic representation of yet another preferred embodiment of the fuel control system of the present invention.

The control system of the present invention comprises yet another preferred embodiment as schematically represented primarily, but not exclusively, in FIG. 8. However, the structural and operational features of the additional preferred embodiment of FIG. 8 is to be considered in combination with the previously described embodiments of FIGS. 1 through 7 in that numerous structural and operative features are common to all of the described embodiments of FIGS. 1 through 8. Therefore, the additional preferred embodiment of the control system of FIG. 8 comprises the electronic control unit 12 structured to monitor predetermined engine data by virtue of at least one but more practically a plurality of data input and input channels 14 and/or 14', as described above. As indicated, the monitored engine data is determinative of engine fuel requirements and will ultimately determine the appropriate, most efficient and/or maximum concentration of gaseous fuel that can be included in the variable fuel mixture or operative fuel mixture, as set forth above, being delivered to the combustion section 24 and/or the individual combustion cylinders 24'. As with the embodiment of FIGS. 2 and 3, the additional preferred embodiment of FIG. 8 includes a pressurized gaseous fuel supply 21 structured to retain and dispense the gaseous fuel under a positive pressure preferably, but not necessarily, of generally about 3 psi to 7 psi. As also emphasized above, each of the one or more mixing assemblies 16 are structured to independently establish a predetermined coordinated mixture and/or ratio of gaseous and distillate fuels, which in turn define the operative fuel mixture for each combustion section 24 and more specifically for each of the combustion chambers 24'. As indicated, the supply of gaseous fuel is maintained at a positive pressure and delivered from the fuel supply 21 to the throttle body 18 and eventually from the throttle body 18 to the corresponding, integrated air gas mixer 20 at such positive pressure. Therefore, the gaseous fuel supply 21, throttle body 18 and integrated air gas mixer 20 are cooperatively structured and collectively operative to deliver gaseous fuel in appropriately increased and variable quantities and under a positive pressure to the intake air 22' of the combustion section 24 of the engine.

Accordingly, in the additional preferred embodiment of FIG. 8, a plurality of mixing assemblies 16 each include an integrated throttle body 18 and air gas mixer 20. As a result, each of the various cylinders 24' of the combustion section 24 may have a different, variable ratio of gaseous and distillate fuels delivered thereto. Accordingly, an effectively different operative fuel mixture or variable mixture of fuel may be consumed in the different combustion chambers 24'. It is also emphasized that the ECU 12 and the one or more input data channels 14 and/or 14' are structured to continuously and repetitively monitor a predetermined plurality of preferably three operating parameters of the engine. The interpretive processing by the ECU of the data received from the monitoring assembly will be determinative of the concentration of gaseous fuel added to the variable mixture of gaseous and distillate fuel delivered to the plurality of cylinders 24' of the combustion section 24.

Moreover, the aforementioned monitoring assembly in this embodiment comprises at least one but preferably a plurality of mass airflow (MAF) sensors 62, as also described herein with reference to the embodiment of FIG. 6. Each of the different (MAF) sensors is disposed in monitoring relation to the intake air flow 22' to the combustion section 24 and more specifically to the plurality of chambers 24'. Further, the monitoring assembly includes at least one but preferably a plurality of temperature sensors 68 disposed and structured relative to the combustion section 24 and/or individual cylinders 24' to determine temperature of exhaust gases there from. Also, the monitoring assembly comprises at least one but preferably a plurality of knock sensors 64 disposed and structured relative to the combustion section 24 and/or each of the plurality of cylinders 24'. The knock sensors 64 individually and collectively determine the occurrence or existence of engine knock in the plurality of cylinders 24', as also described with regard to the preferred embodiment of FIGS. 3 and 6.

Accordingly, each of the plurality of mixing assemblies 16 comprises the integrated throttle body and air gas mixer 18 and 20 respectively. Further, each of the throttle bodies 18 is independently connected in gaseous fuel receiving relation to a common and/or separate fuel supply 21. As also represented, each of the air gas mixers 20 is disposed in fluid communication with a different flow path 22 and the intake air 22' associated therewith. The integrated structure of each of the mixing assemblies 16 include a throttle body 18 fixedly mounted on and/or connected to an exterior of a corresponding housing 26 of the associated, integrated air gas mixer 20. Similarly, each of the air gas mixers 20 includes a delivery nozzle 30 receiving gaseous fuel from a corresponding, integrated throttle body 18 through a delivery conduit 40. As such, each of the delivery conduits 40 is disposed within the interior 28 the housing 26 of corresponding ones of the air gas mixers 20.

In the additional preferred embodiment of FIG. 8, the predetermined plurality of three operating parameters specifically include a mass flow rate of intake air to a combustion section 24 or individual combustion cylinders 24'. The preferred 3 operating parameters further include the exhaust gas temperature from the combustion section 24 or each of the combustion cylinders 24'. Further, an additional one of the predetermined plurality of 3 operating parameters also includes the existence or occurrence of engine knock in the combustion section 24.

Therefore, the ECU 12 is operative to establish an increased or maximum concentration of gaseous fuel in the variable fuel mixture serving to power the engine. Moreover, the concentration of gaseous fuel supplied to and comprising a portion of the variable fuel mixture will be in direct compliance with at least the monitored ones of the three predetermined operating parameters, as set forth above, with which the plurality of sensors of with the monitoring assembly are associated.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. A control system for establishing gaseous fuel input for a compression ignition engine operative on a variable mixture of gaseous and distillate fuels, said control system comprising:
    a monitoring assembly operatively disposed and structured to determine a plurality of three predetermined operating parameters of the engine, independent of load conditions of the engine;
    said three predetermined operating parameters comprise mass flow rate of intake air to the combustion section of the engine; temperature of exhaust gas from the combustion section and an occurrence of engine knock in the combustion section;
    said monitoring assembly comprising at least one of mass airflow (MAF) sensor structured to monitor the mass flow rate of air and disposed in monitoring relation to the intake air flow to a combustion section of the engine; at least one temperature sensor structured to monitor the temperature of the exhaust gas and disposed and structured to determine temperature of exhaust gases from the combustion section of the engine and at least one knock sensor operatively disposed relative to the combustion section and structured to determine an occurrence of engine knock;
    an electronic control unit (ECU) connected to said monitoring assembly and configured to interpretively process data from said monitoring assembly, associated with at least two of said plurality of three operating parameters, and
    said ECU operative to establish a concentration of gaseous fuel in the variable fuel mixture sufficient to comply with monitored ones of said three predetermined operating parameters.

2. A control system as recited in claim 1 wherein said ECU is operative to establish said sufficient concentration of the gaseous fuel to comply with at least two of said predetermined plurality of operating parameters being monitored.

3. A control system as recited in claim 2 wherein at least one of said two operating parameters comprises the mass flow rate of intake air to a combustion section of the engine.

4. A control system as recited in claim 2 wherein at least one of said two operating parameters comprises the exhaust gas temperature of the engine.

5. A control system as recited in claim 2 wherein at least one of said two operating parameters comprises the engine knock.

6. A control system as recited in claim 1 wherein said ECU is operative to establish said sufficient concentration of the gaseous fuel to comply with all three of said predetermined plurality of operating parameters.

7. A control system as recited in claim 1 wherein a maximum concentration of gaseous fuel input into the variable mixture is generally about 4.5% by volume of the mass flow rate of intake air.

8. A control system as recited in claim 1 further comprising a throttle assembly structured to deliver variable quantities of the gaseous fuel to the intake air flow; said ECU operatively connected to said throttle assembly and determinative of the concentration of gaseous fuel in the variable fuel mixture dependent on compliance with at least some of said three predetermined operating parameters being monitored.

9. A control system as recited in claim 8 wherein said throttle assembly is cooperatively structured with said ECU to deliver variable quantities of gaseous fuel to the intake air flow dependent at least on the mass flow rate of intake air to the combustion section of the engine.

10. A control system as recited in claim 9 wherein said concentration of gaseous fuel in the variable fuel mixture comprises a maximum gaseous fuel input of 4.5% by volume of the mass flow rate of intake air.

11. A control system as recited in claim 8 wherein said throttle assembly is cooperatively structured with said ECU to regulate delivery of gaseous fuel to the intake air based on a determination of engine knock in the combustion section of the engine.

12. A control system as recited in claim 8 wherein said throttle assembly is cooperatively structured with said ECU to regulate delivery of gaseous fuel to the intake air based on a temperature of the exhaust gas from the combustion section of the engine.

13. A control system as recited in claim 1 wherein said monitoring assembly comprises:
    a plurality of mass airflow (MAF) sensors each disposed in monitoring relation to the intake air flow to a different cylinder of a combustion section of the engine;
    a plurality of temperature sensors disposed and structured to determine temperature of exhaust gases from each cylinder of the combustion section of the engine; and
    a plurality of knock sensors each operatively disposed relative to a different cylinder of the combustion section and structured to determine an occurrence of engine knock therein.

* * * * *